United States Patent
Moriya

(10) Patent No.: US 8,036,439 B2
(45) Date of Patent: Oct. 11, 2011

(54) SIZE MEASUREMENT APPARATUS, IMAGE DISPLAY UNIT, COMPUTER-READABLE SIZE MEASUREMENT PROGRAM STORAGE MEDIUM, AND COMPUTER-READABLE IMAGE DISPLAY PROGRAM STORAGE MEDIUM

(75) Inventor: Yoshiyuki Moriya, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 625 days.

(21) Appl. No.: 12/212,934

(22) Filed: Sep. 18, 2008

(65) Prior Publication Data
US 2009/0080692 A1    Mar. 26, 2009

(30) Foreign Application Priority Data

Sep. 21, 2007    (JP) .................... 2007-245536

(51) Int. Cl.
*G06K 9/00* (2006.01)
(52) U.S. Cl. ........................................... 382/128
(58) Field of Classification Search .................. None
See application file for complete search history.

(56) References Cited

U.S. PATENT DOCUMENTS

| | | | | |
|---|---|---|---|---|
| 7,266,233 B2* | 9/2007 | Chang et al. | ............... | 382/141 |
| 7,499,579 B2* | 3/2009 | Squilla et al. | ............... | 382/132 |
| 2007/0242069 A1* | 10/2007 | Matsue et al. | ............... | 382/128 |
| 2009/0087047 A1* | 4/2009 | Moriya | ............... | 382/128 |
| 2009/0087059 A1* | 4/2009 | Moriya | ............... | 382/131 |
| 2009/0310843 A1* | 12/2009 | Moriya | ............... | 382/131 |
| 2010/0142788 A1* | 6/2010 | Matsumoto | ............... | 382/131 |

FOREIGN PATENT DOCUMENTS

| | | |
|---|---|---|
| JP | H11-342132 | 12/1999 |
| JP | 2003-099021 | 4/2003 |
| JP | 2004-96417 A | 3/2004 |
| WO | WO 2005/117712 A1 | 12/2005 |

OTHER PUBLICATIONS

Okada et al., "Robust Anisotropic Gaussian Fitting for Volumetric Characterization of Pulmonary Nodules in Multislice CT," IEEE Transactions on Medical Imaging, 2005, pp. 1-15.

* cited by examiner

*Primary Examiner* — Jermele M Hollington
(74) *Attorney, Agent, or Firm* — Birch, Stewart, Kolach & Birch, LLP

(57) ABSTRACT

A size measurement apparatus comprises a designation section that designates parts in images of two or more medical images acquired through image taking for a subject; a first measurement section that measures a size of an image on a part designated by the designation section, of the medical image, as to a measurement direction associated with a geometry of the image; and a second measurement section that measures a size of a common measurement direction common to two or more medical images, the common measurement direction being determined in accordance with the measurement direction in the first measurement section.

10 Claims, 13 Drawing Sheets

SIZE MEASUREMENT APPARATUS, IMAGE DISPLAY UNIT, COMPUTER-READABLE SIZE MEASUREMENT PROGRAM STORAGE MEDIUM, AND COMPUTER-READABLE IMAGE DISPLAY PROGRAM STORAGE MEDIUM

BACKGROUND OF THE INVENTION

1. Field of the Invention

The present invention relates to a size measurement apparatus for measuring a size of the subject on an image, a computer-readable size measurement program storage medium, an image display unit for displaying an image, and a computer-readable image display program storage medium.

2. Description of the Related Art

Hitherto, in the field of the medical treatment, a medical image, which is obtained through taking a picture of the inside of the body of the subject with an X-ray image taking apparatus, an ultrasonic apparatus, and an endoscope apparatus, etc. is widely used for the diagnosis of the condition of the subject. The use of the medical image for the diagnosis makes it possible to understand the progress of the condition of the subject without giving the subject external damage, and also makes it possible to obtain easily information necessary for the decision of the treatment policy.

Moreover, in recent years, there are widely used CR (Computed Radiography) device that obtains a digital medical image by using the radiation, CT (Computerized Tomography) device that obtains a tomographic image of a testee or subject by using the radiation, and MRI (Magnetic Resonance Imaging) device that obtain a tomographic image of a testee or subject by using a strong magnetic field. And a digital medical image is generally used instead of a medical image that uses a past X-ray film etc. Digitalizing of the medical image makes it possible to collectively manage clinical records and the like so that the clinical records can be shared via the network in two or more hospitals etc. Thus, even if the diagnosis and treatment section and the hospital change, a medical image and the clinical record where the case history till then is shown can be applied.

Here, at the time of an actual diagnosis, there is performed a comparison interpretation of radiogram wherein two or more medical images, which are taken in picture at different time on the same subject, are arranged and displayed on a monitor (For instance, refer to Japanese Patent Application Laid Open Gazette TokuKai 2004-96417). The comparison interpretation of radiogram can easily confirm the change in the size of the focus and the like, and thus it is one of the methods very useful for the diagnosis of the effect of the condition and treatment. However, the method of the comparison interpretation of radiogram involves such a problem that even if two or more medical images are arranged and the area of interest that seems to be changes is expanding displayed, the change is blind when the increase and decrease of the focus is a little.

In this respect, non-patent reference 1 discloses a technology in which an image feature such as the luminance distribution in the tumor area in the image is analyzed, and the outline of the tumor is acquired by extracting the area that has the image feature approximated to an image feature of the tumor area from among a medical image. The change of the condition and the result of the treatment can more certainly be recognized by acquiring the outline of the tumor area in a medical image by using this technology, and measuring a length diameter and a short diameter of the tumor based on the outline.

Non-patent reference 1: K. Okada, D. Comaniciu, A. Krishnan, "Robust Anisotropic Gaussian Fitting for Volumetric Caracterization of Pulumonary Nodules in Multislice CT", IEEE Trans. Medical Imaging, Vo. 24, No. 3, pp. 409-423, 2005

However, it might be very difficult to take a picture of the subject at mutually different time by the same posture as fit, and the position and the angle of the subject that is reflected in a medical image might shift by the change and breath, etc. of the physique. Moreover, there is frequent such a case that the shape such as tumors is near circle and asymmetry, and thus the direction of a length diameter and a short diameter changes greatly as a little change of the shape. Therefore, the shape such as tumors is unsuitable to the comparison. It is requested for the comparison interpretation of radiogram that the change of the condition and the effect of the treatment are understood accurately, and the development of the technology that can measure the size that is appropriate for the comparison is demanded.

SUMMARY OF THE INVENTION

In view of the foregoing, it is an object of the present invention to provide a size measurement apparatus capable of performing a size measurement suitable for a comparison, a size measurement program, an image display unit for displaying an image, and an image display program.

To achieve the above-mentioned objects, the present invention provides a size measurement apparatus comprising:

a designation section that designates parts in images of two or more medical images acquired through image taking for a subject;

a first measurement section that measures a size of an image on a part designated by the designation section, of the medical image, as to a measurement direction associated with a geometry of the image; and a second measurement section that measures a size of a common measurement direction common to two or more medical images, the common measurement direction being determined in accordance with the measurement direction in the first measurement section.

According to the size measurement apparatus of the present invention, there is measured a size of a common measurement direction mutually common to the two or more medical images, of the designated part, on individual medical images. This feature makes it possible to comparably and exactly measure focuses and the like on the two or more medical images. Thus, it is possible to easily obtain useful information for a diagnosis.

In the size measurement apparatus according to the present invention as mentioned above, it is preferable that the first measurement section measures a length diameter and a short diameter of the image.

In recent years, there is designed a one click measurement in which when a noteworthy part is designated in a medical image, the outline of a morbid state change area including the noteworthy part is extracted and a length diameter and a short diameter of the morbid state change area are measured. According to the size measurement apparatus of the present invention, it is possible to apply the technology of this one click measurement.

In the size measurement apparatus according to the present invention as mentioned above, it is preferable that the designation section designate a part on an image as to a part of medical image of the two or more medical images in accordance with an operation, and designates a part that corresponds to the part on the image as to a medical image different from the medical image for which the part is designated among the two or more medical images.

According to this desirable size measurement apparatus, when the part that seems to be a focus is designated on a part of medical image of two or more medical images, a part that corresponds to the part designated on other medical images is automatically designated. Therefore, it is possible to easily measure the size such as focuses by omitting annoying work even in a case where a lot of medical images are displayed.

In the size measurement apparatus according to the present invention as mentioned above, it is preferable that the first measurement section measures a size of the image as to one of the two or more medical images, and the second measurement section measures a size of an image on the part designated by the designation section as to a medical image different from the medical image of which the size is measured by the first measurement section, of the two or more medical images, in same measurement direction as the measurement direction in the first measurement section.

According to this desirable size measurement apparatus, it is possible to easily obtain the size of same measurement direction as the measurement direction in the first measurement part, of the tumor and the like on two or more medical images.

In the size measurement apparatus according to the present invention as mentioned above, it is preferable that the first measurement section measures a size of an individual image of the two or more medical images, as to an individual measurement direction associated with a geometry of the individual image;

the second measurement section measures a size of an individual image of the two or more medical images, as to same measurement direction as the measurement direction used in the first measurement section for another image; and the size measurement apparatus further comprises a maximum difference direction discriminating section that determines a measurement direction which is maximum in a size difference among mutual images, of the individual measurement directions used in the first measurement section and the second measurement section.

According to this desirable size measurement apparatus, it is possible to confirm the amount of the change in the direction where tumors and the like grow up on two or more medical images most.

In the size measurement apparatus according to the present invention as mentioned above, it is preferable that the first measurement section measures a size of the image for the two or more medical images, and the second measurement section measures a size of the image for the medical image as to a direction of mean of the measurement directions of the two or more medical images in the first measurement section.

According to this desirable size measurement apparatus, it is possible to confirm the amount of the change in the averaged size of tumors and the like on two or more medical images.

In the size measurement apparatus according to the present invention as mentioned above, it is preferable that the size measurement apparatus further comprises a misregistration correction section that detects a misregistration of the image among the two or more medical images, and the second measurement section measures a size of the image taking into consideration the misregistration detected by the misregistration correction section.

Consideration of misregistration between the morbid state change areas on two or more medical images makes it possible to compute the size of the morbid state change areas with greater accuracy.

In the size measurement apparatus according to the present invention as mentioned above, it is preferable that the first measurement section measures a size of the image for the two or more medical images, the size measurement apparatus further comprises a permission request section that requests a permission for size measurement by the second measurement section when the measurement directions of the two or more medical images in the first measurement section are beyond a predetermined level, and the second measurement section measures a size of the image when the size measurement is permitted for request by the permission request section.

When the measurement direction of individual image in two or more medical images is beyond a prescribed level, unnecessary processing can be omitted by execution/discontinue of the size measurement being selected, and it is possible to inform the user of the matter that the discrepancy of the images in two or more medical images is large, and the shape of the morbid state change has changed greatly.

To achieve the above-mentioned objects, the present invention provides an image display unit comprising:

a designation section that designates parts in images of two or more medical images acquired through image taking for a subject;

a first measurement section that measures a size of an image on a part designated by the designation section, of the medical image, as to a measurement direction associated with a geometry of the image;

a second measurement section that measures a size of a common measurement direction common to two or more medical images, the common measurement direction being determined in accordance with the measurement direction in the first measurement section; and a display section that displays the two or more medical images and in addition sizes of images measured with the second measurement section.

According to the image display unit as mentioned above, it is possible to measure the size of individual morbid state change area of two or more medical images with great accuracy good, and also to surely recognize by the figure the change in the size of the focus not understood easily only from the comparison interpretation of radiogram etc.

With respect to the image display unit of the present invention, only the basic aspects are disclosed here. It is noted that the image display unit of the present invention includes not only the basic aspects, but also various aspects corresponding to the above-mentioned aspects of the size measurement apparatus.

To achieve the above-mentioned objects, the present invention provides a size measurement program storage medium storing a size measurement program which causes a computer to operate as a size measurement apparatus, when the size measurement program is executed in the computer, wherein the size measurement program storage medium stores the size measurement program comprising:

a designation section that designates parts in images of two or more medical images acquired through image taking for a subject;

a first measurement section that measures a size of an image on a part designated by the designation section, of the medical image, as to a measurement direction associated with a geometry of the image; and a second measurement section that measures a size of a common measurement direction common to two or more medical images, the common measurement direction being determined in accordance with the measurement direction in the first measurement section.

With respect to the size measurement program storage medium of the present invention too, only the basic aspects are disclosed here. It is noted that the size measurement program storage medium of the present invention includes not only the basic aspects, but also various aspects corresponding to the above-mentioned aspects of the size measurement apparatus.

With respect to the structural elements such as the first measurement section constituting the size measurement program related to the present invention, it is acceptable that function of one structural element is implemented by one program part, function of one structural element is implemented by a plurality of program parts, or alternatively functions of a plurality structural elements are implemented by one program part. Further, it is acceptable that those structural elements are executed by oneself or by instruction to another program or program parts incorporated into a computer.

To achieve the above-mentioned objects, the present invention provides an image display program storage medium storing an image display program which causes a computer to operate as an image display unit, when the image display program is executed in the computer, wherein the image display program storage medium stores the image display program comprising:

a designation section that designates parts in images of two or more medical images acquired through image taking for a subject;

a first measurement section that measures a size of an image on a part designated by the designation section, of the medical image, as to a measurement direction associated with a geometry of the image;

a second measurement section that measures a size of a common measurement direction common to two or more medical images, the common measurement direction being determined in accordance with the measurement direction in the first measurement section; and a display section that displays the two or more medical images and in addition sizes of images measured with the second measurement section.

With respect to the image display program storage medium of the present invention too, only the basic aspects are disclosed here. It is noted that the image display program storage medium of the present invention includes not only the basic aspects, but also various aspects corresponding to the above-mentioned aspects of the size measurement apparatus.

With respect to the structural elements such as the first measurement section constituting the image display program related to the present invention, it is acceptable that function of one structural element is implemented by one program part, function of one structural element is implemented by a plurality of program parts, or alternatively functions of a plurality structural elements are implemented by one program part. Further, it is acceptable that those structural elements are executed by oneself or by instruction to another program or program parts incorporated into a computer.

DETAILED DESCRIPTION OF PREFERRED EMBODIMENTS

Embodiments of the present invention will be described with reference to the accompanying drawings.

Figure 1:
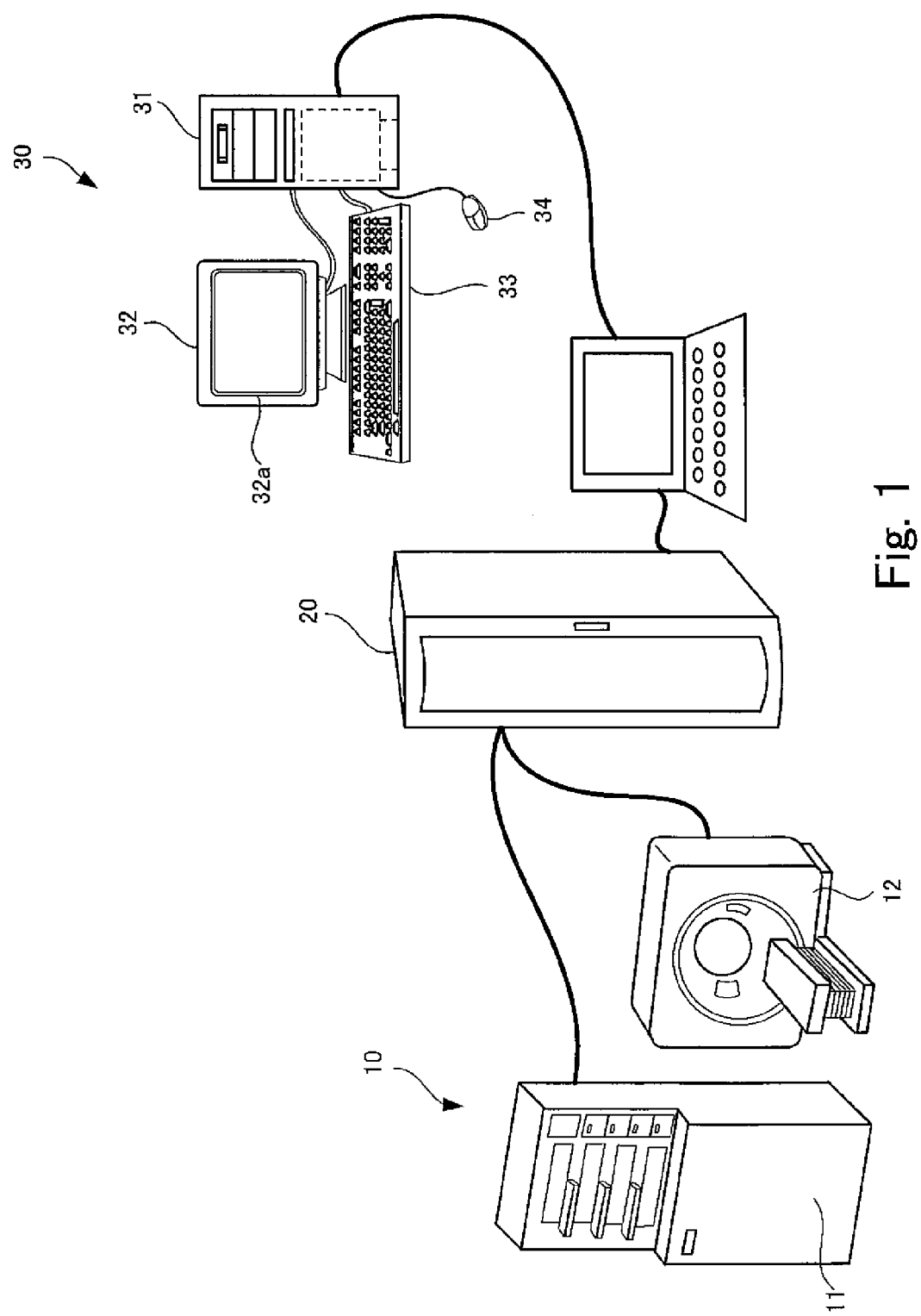
FIG. 1 is a schematic construction view of a medical treatment diagnostic system to which is one embodiment of the present invention is applied.

FIG. 1 is a schematic construction view of a medical treatment diagnostic system to which is one embodiment of the present invention is applied.

A medical treatment diagnostic system shown in FIG. 1 comprises: an image generation apparatus 10 that generates a medical image through taking picture inside a subject; a management server 20 that preserves medical image and clinical record and the like; and a diagnosis apparatus 30 that displays a medical image. The image generation apparatus 10 and the management server 20, and the management server 20 and the diagnosis apparatus 30 are connected through a network line.

According to the medical treatment diagnostic system, the identification number to identify individual subject is allocated to the subject of the first medical examination, and the identification number is associated with the clinical record where the subject's name, age, and the case history, etc. are shown and it is registered in the management server 20.

The image generation apparatus 10 comprises: CR device 11 that projects radiation to the subject, reads radiation that has penetrated the subject, and generates a digital medical image; MRI device 12 that generates a tomographic image of the subject by using strong magnetic field and electric wave; CT device (not illustrated) that generates a tomographic image of the subject by using radiation; and a ultrasonic device (not illustrated) that generates a medical image reading echo of a supersonic wave. The medical image, which is generated by the image generation apparatus 10, is transmitted to the management server 20 together with the identification number to identify the subject.

The management server 20 receives the medical image and the identification number transmitted from the image generation apparatus 10 and stores those with association. That is, the management server 20 registers the identification number, the clinical record of the subject to which the identification number is allocated, and the medical image of the subject in their association.

The diagnosis apparatus 30 comprises: a main frame unit 31; an image display unit 32 that displays an image on a display screen 32a in accordance with an instruction from the main frame unit 31; a keyboard 33 that inputs various kinds of information according to key operation to the main frame unit 31; and a mouse 34 that inputs an instruction according to icons for instance displayed at the position by specifying arbitrary position on the display screen 32a.

When a user inputs the name and the identification number etc. of the subject using the mouse 34 and the like of the diagnosis apparatus 30, the content of the input is transmitted to the management server 20. The management server 20 transmits to the diagnosis apparatus 30 medical image and clinical record associated with name and identification number of the subject transmitted from the diagnosis apparatus 30. According to the diagnosis apparatus 30, the medical image transmitted to the management server 20 is displayed on the display screen 32a. The medical treatment diagnostic system of the present embodiment has a one click measurement function in which when a morbid state change part, that seems to be focus on the medical image displayed on the display screen 32a, is specified, a size of a morbid state change area including the morbid state change part is measured. A confirmation of the medical image displayed on the display screen 32a and the size of a morbid state change area makes it possible for a user to diagnose the condition of the subject without giving the subject external damage.

The user diagnoses the condition of the subject by seeing the medical image displayed on the display screen 32a of the diagnosis device 30, and edits the clinical record using the mouse 34 and the keyboard 33. The clinical record after the edition is transmitted to the management server 20, and the clinical record memorized in the management server 20 is replaced by a new clinical record which has been sent from the diagnosis apparatus 30.

The medical treatment diagnostic system shown in FIG. 1 is composed basically as mentioned above.

Here, the feature as one embodiment of the present invention in the medical treatment diagnostic system resides in the content of processing executed with the diagnosis apparatus 30. Hereafter, it explains diagnosis apparatus 30 in detail.

Figure 2:
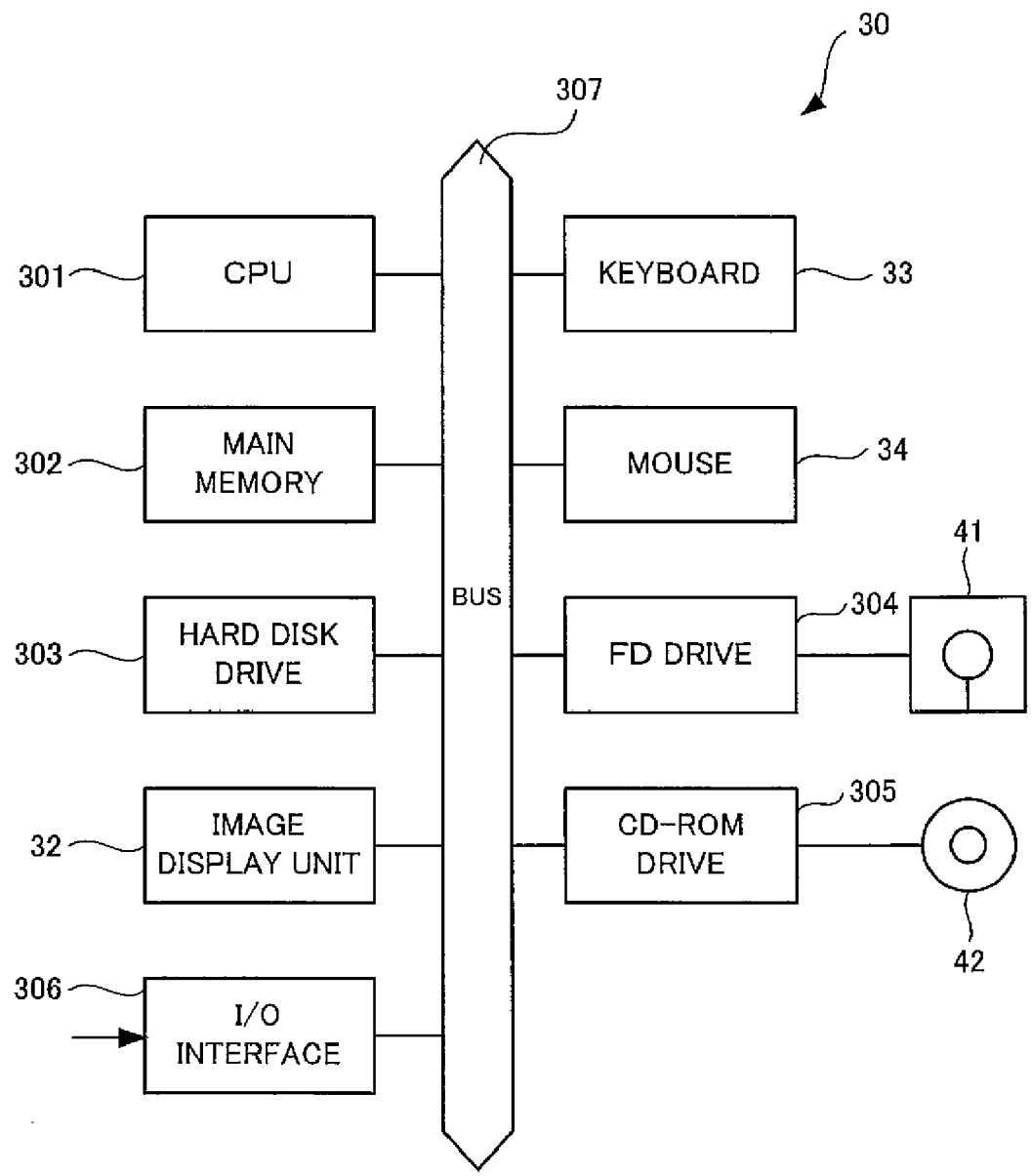
FIG. 2 is a hardware construction view of a diagnostic apparatus.

FIG. 2 is a hardware construction view of a diagnostic apparatus.

The main frame unit 31 of the diagnosis apparatus 30 incorporates therein, as shown in FIG. 2, a CPU 301 for executing various kinds of programs, a main memory 302 in which a program stored in a hard disk unit 303 is read to be developed for execution by the CPU 301, the hard disk drive 303 where various programs and data, etc. are preserved, FD drive 304 that is loaded with FD 41, and accesses the FD41, CD-ROM drive 305 that accesses CD-ROM 42, and I/O interface 306 that receives image data and the like from the management server 20, and sends various instruction data to the management server 20. Those various elements are connected via a bus 307 to the image display unit 32, the keyboard 33 and the mouse 34 which are shown in FIG. 1 too.

The CD-ROM 42 stores a medical image display program 100 (Refer to FIG. 3) that is an embodiment of a size measurement program and an image display program of the present invention to construct an embodiment of the size measurement apparatus and the image display unit of the present invention in the diagnosis apparatus 30, respectively.

Figure 3:
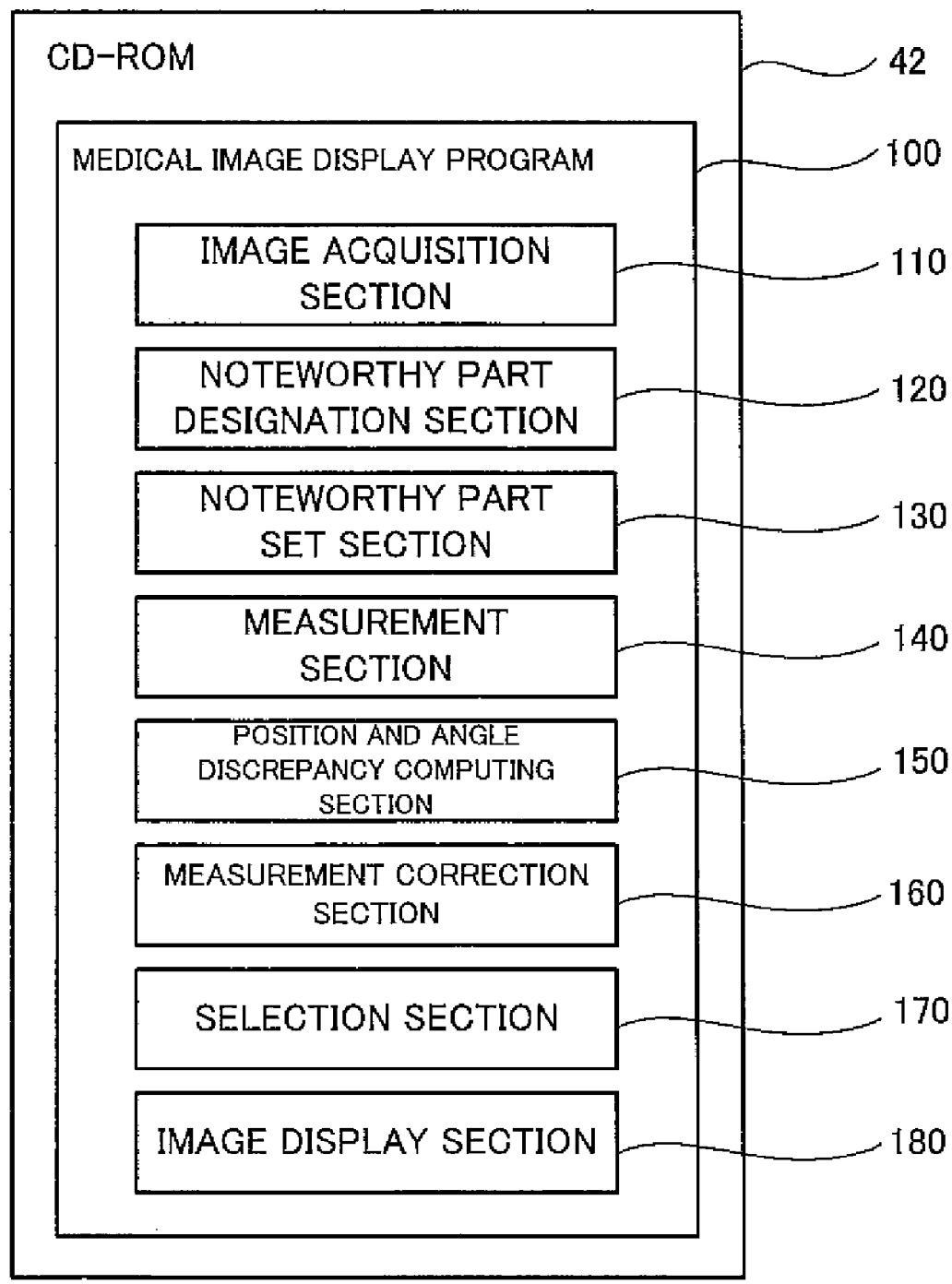
FIG. 3 is a conceptual view of CD-ROM.

FIG. 3 is a conceptual view of CD-ROM.

As shown in FIG. 3, the medical image display program 100 stored in the CD-ROM 42 comprises: an image acquisition section 110, a noteworthy part designation section 120, a noteworthy part set section 130, a measurement section 140, position and angle discrepancy computing section 150, a measurement correction section 160, a selection section 170, and an image display section 180.

The CD-ROM 42 is loaded on the CD-ROM drive 305 of the diagnosis apparatus 30, so that the medical image display program 100, which is stored in the CD-ROM 42, is uploaded on the diagnosis apparatus 30 and is stored in the hard disk drive 303. Execution of the medical image display program 100 makes it possible to construct in the diagnosis apparatus 30 a medical image display unit that is an embodiment of the image display unit of the present invention.

Incidentally, according to the present embodiment as mentioned above, there is exemplarily disclosed the CD-ROM 42 as the storage medium which stores the medical image display program 100. However, it is noted that the storage medium which stores the medical image display program 100 is not restricted to the CD-ROM 42, it is acceptable that the CD-ROM 42 is replaced by storage medium such as optical disk, MO, FD, and magnetic tapes. Moreover, it is acceptable that the medical image display program 100 is supplied directly to the diagnosis device 30 without the storage medium through the I/O interface 306.

Details of individual sections of the medical image display program 100 will be described in conjunction with functions of individual sections of a medical image display unit 200.

Figure 4:
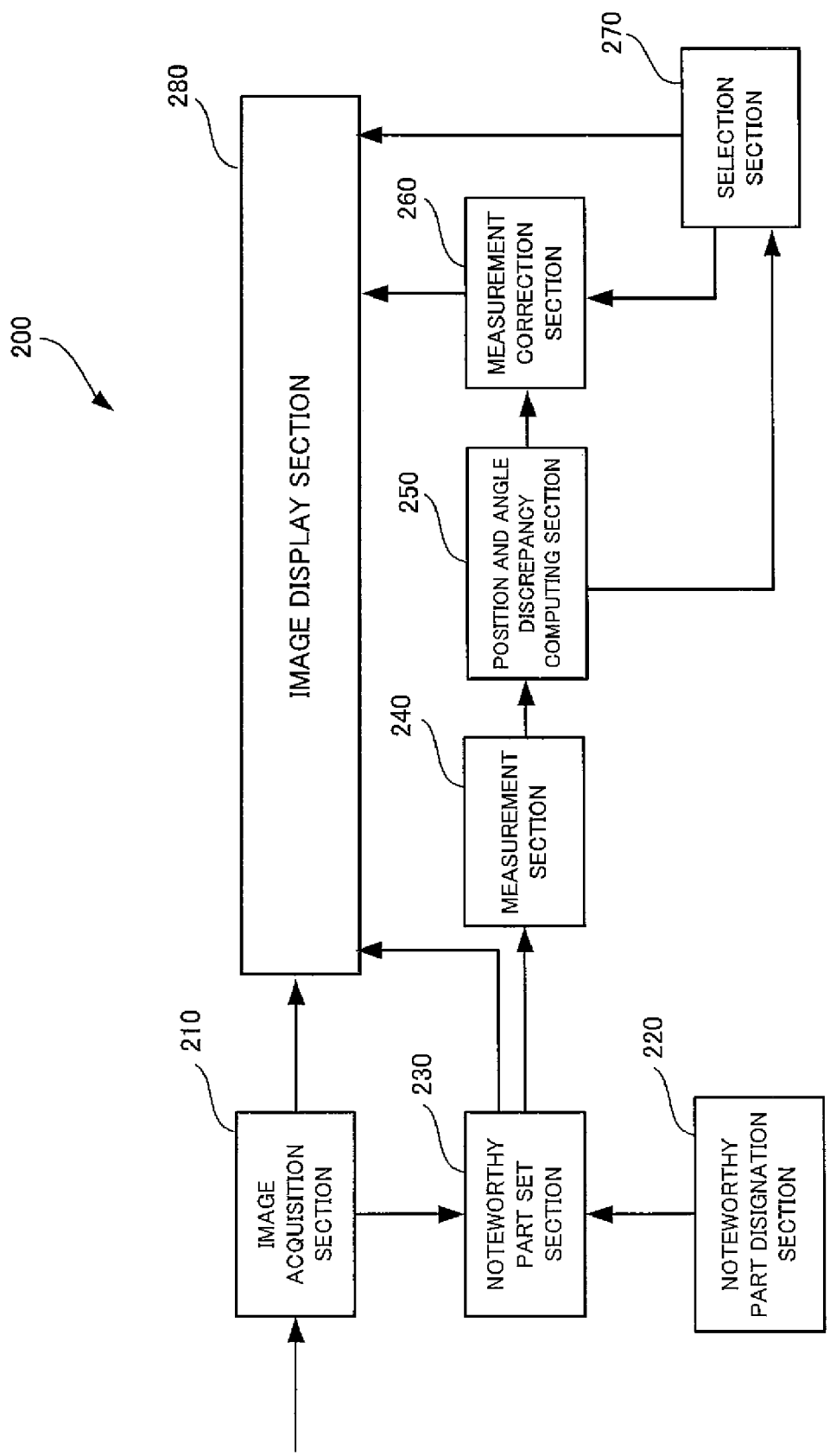
FIG. 4 is a functional block diagram of a medical image display unit.

FIG. 4 is a functional block diagram of the medical image display unit 200.

The medical image display unit 200 comprises: an image acquisition section 210, a noteworthy part designation section 220, a noteworthy part set section 230, a measurement section 240, position and angle discrepancy computing section 250, a measurement correction section 260, a selection section 270, and an image display section 280.

The image acquisition section 210, the noteworthy part designation section 220, the noteworthy part set section 230, the measurement section 240, the position and angle discrepancy computing section 250, the measurement correction section 260, the selection section 270, and the image display section 280, which constitute the medical image display unit 200, correspond to the image acquisition section 110, the noteworthy part designation section 120, the noteworthy part set section 130, the measurement section 140, the position and angle discrepancy computing section 150, the measurement correction section 160, the selection section 170, and the image display section 180, which constitute the medical image display program 100 shown in FIG. 3, respectively.

Individual element of FIG. 4 is composed of the combination of the hardware of the computer and OS and the application program executed with the computer. To the contrary, individual element of the medical image display program 100 shown in FIG. 3 is composed of the application program only.

Figure 5:
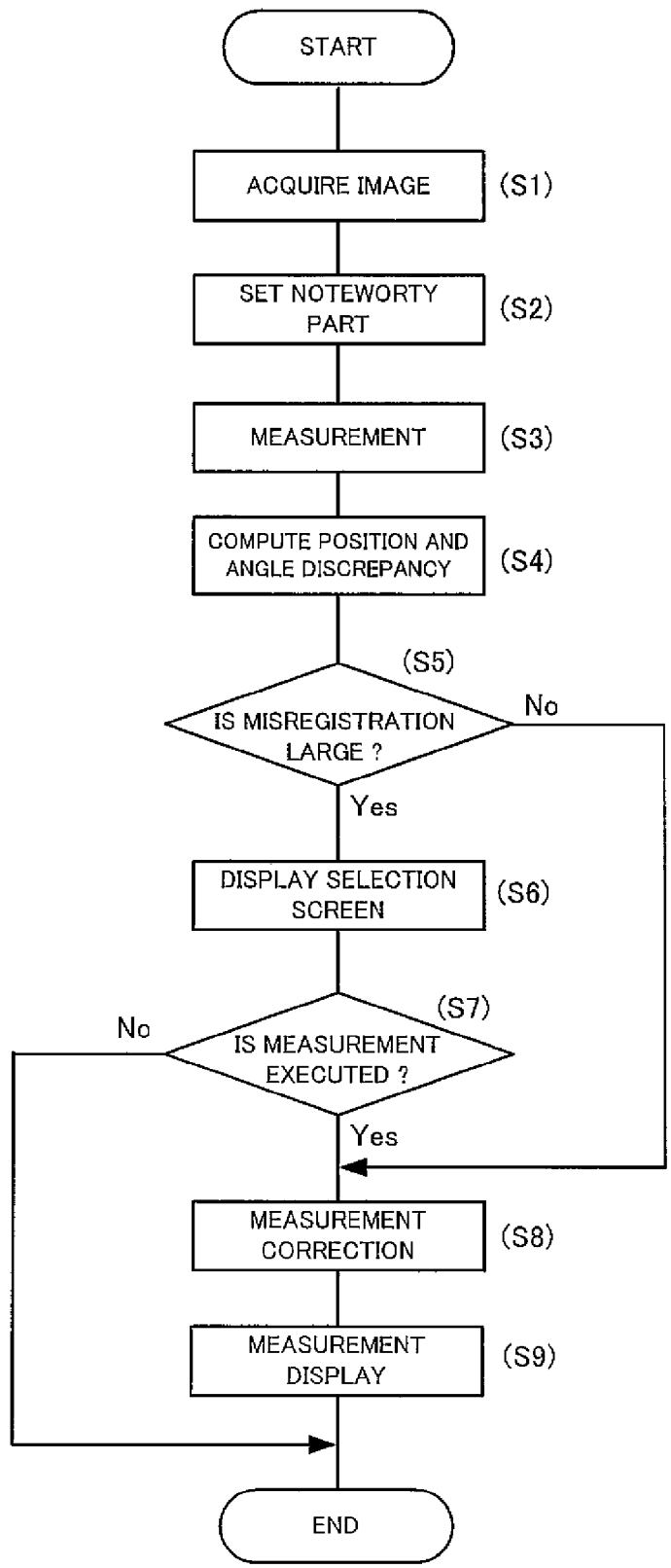
FIG. 5 is a flowchart useful for understanding a series of processing wherein a medical image is acquired from a management server, and the acquired medical image and a size of a morbid state change area in the medical image are displayed.

FIG. 5 is a flowchart useful for understanding a series of processing wherein a medical image is acquired from a management server 20, and the acquired medical image and a size of a morbid state change area in the medical image are displayed, in the medical image display unit 200.

Hereinafter, there will be explained an operation of individual element of the medical image display unit 200 shown in FIG. 4 in accordance with the flowchart of FIG. 5, and individual element of the medical image display program 100 shown in FIG. 3 as well.

When a user inputs the name and the identification number etc. of the subject using the mouse 34 and the keyboard 33 of the diagnosis apparatus 30 shown in FIG. 1, the content of the input is transmitted via the I/O interface 306 to the management server 20. The management server 20 transmits to the diagnosis apparatus 30 medical image and clinical record associated with name and identification number of the subject transmitted from the diagnosis apparatus 30.

The image acquisition section 210 shown in FIG. 4 receives the medical image transmitted from the management server 20 (step S1 of FIG. 5).

Figure 6:
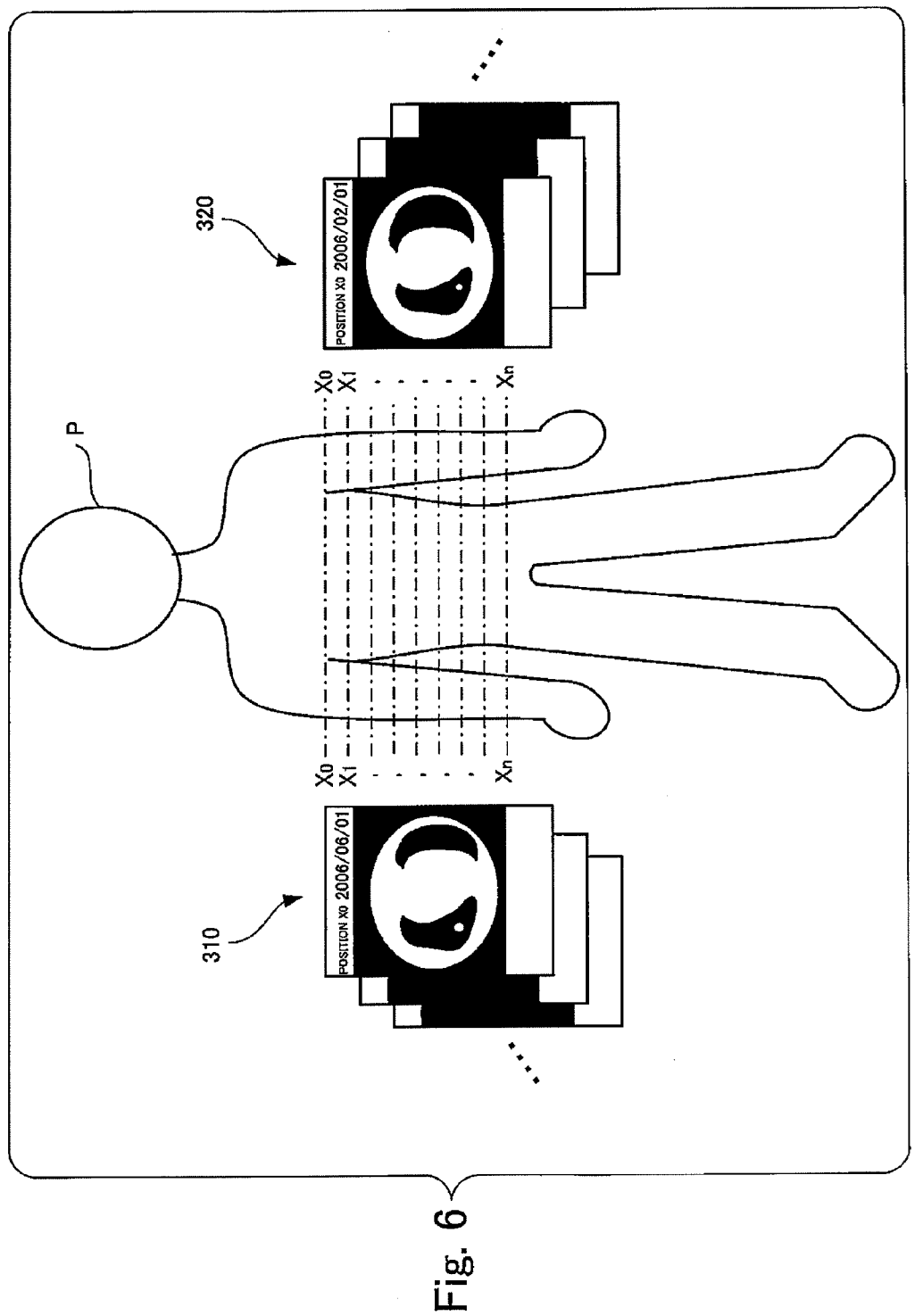
FIG. 6 is a view showing an image of a medical image transmitted from a management server.

FIG. 6 is a view showing an image of a medical image transmitted from the management server 20.

In the MRI device 12 shown in FIG. 1, each section is taken of a picture when a subject P is cut within the range of taking a picture where it is included from the chest to the root of the foot at prescribed intervals in a state that the head of the subject P is set to a prescribed position on an inspection stand and the subject P laid oneself down. Coordinates X0-Xn of individual tomographic images at the cutting position within the range of taking a picture are allocated to two or more tomographic images taken a picture. According to the present embodiment, the same subject P is taken of a picture two times by using MRI device 12 at mutually different time, and tomographic image groups 310 and 320 composed of two or more tomographic images are generated in those each taking a picture and those tomographic image groups 310 and 320 are stored in the management server 20. The image acquisition section 210 acquires those two times of tomographic image groups 310 and 320. Thus acquired tomographic image groups 310 and 320 are transmitted to the image display section 280 and the noteworthy part set section 230.

The image display section 280 displays on the display screen 32a shown in FIG. 1 a tomographic image display screen 410 (refer to FIG. 7) including the tomographic image groups 310 and 320 which are transmitted from the image acquisition section 210. The image display section 280 corresponds to an example of the image display section referred to in the present invention.

Figure 7:
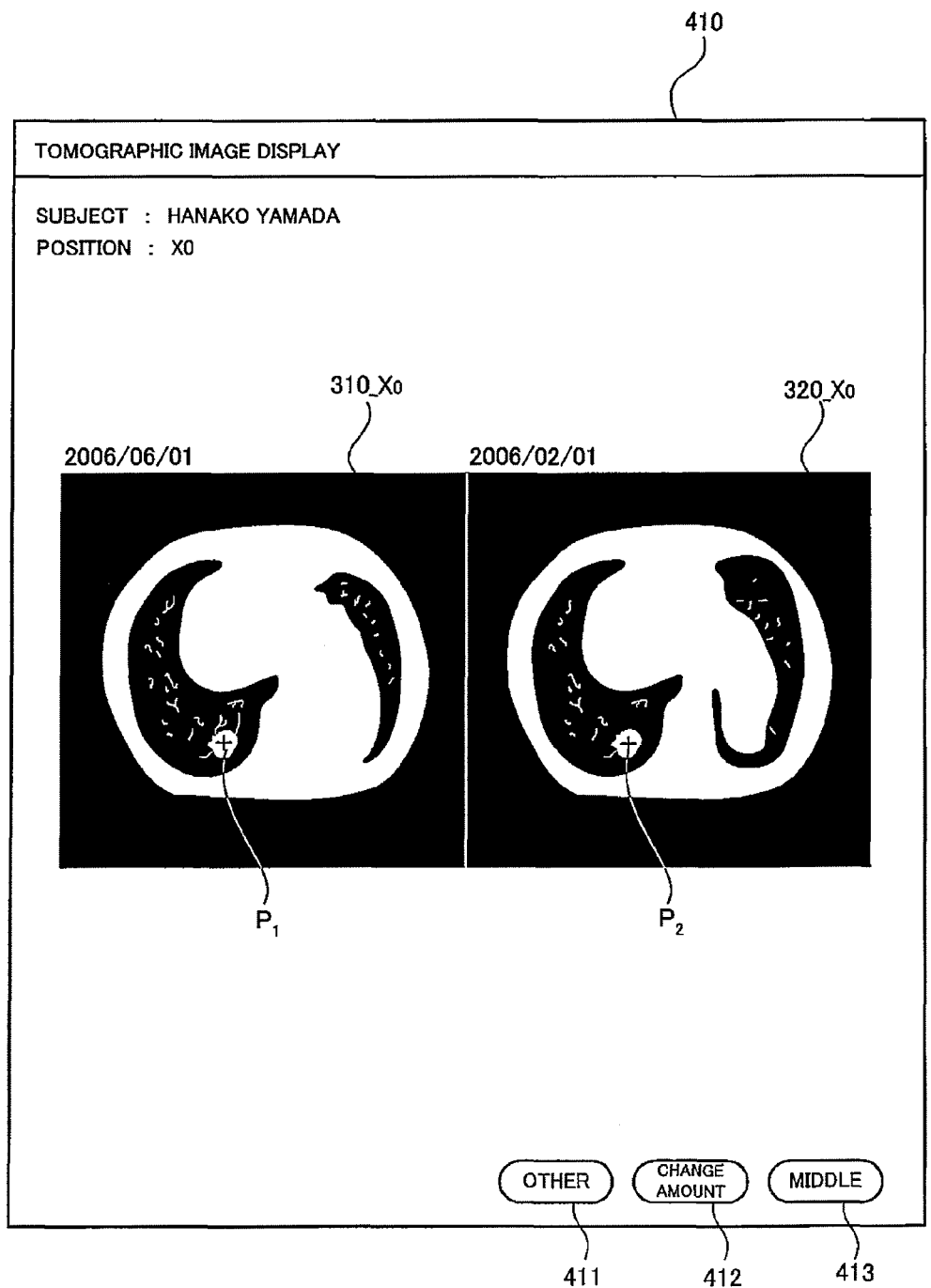
FIG. 7 is a view showing an example of a display screen for a tomographic image.

FIG. 7 is a view showing an example of a display screen for a tomographic image.

A tomographic image display screen 410 shown in FIG. 7 displays tomographic images 310_X0 and 320_X0 in one cutting position X0, of the tomographic images constituting the tomographic image groups 310 and 320, and in addition displays position where the tomographic images 310_X0 and 320_X0 are cut, photograph day, and subject name. The tomographic image display screen 410 has: an other button 411 that sets measurement direction and measurement position to the other tomographic image side; a change amount button 412 that sets it to measurement direction and measurement position where a morbid state change area is large in amount of change; and a middle button 413 that sets it to the middle of measurement direction and measurement position of each two tomographic images, which buttons are used when the size of the morbid state change area on the tomographic images 310_X0 and 320_X0 is measured.

According to the medical image display unit 200 of the present embodiment, first of all, noteworthy part P1 is set on another tomographic image of two tomographic images 310_X0 and 320_X0 (step S2 in FIG. 5). According to the example of FIG. 7, a user uses the mouse 34 shown in FIG. 1 to click a noticed point on the tomographic image 310_X0, and then clicks either one of other button 411, the change amount button 412, and the middle button 413, so that the noteworthy part designation section 220 shown in FIG. 4 informs the noteworthy part set section 230 of a position of the clicked noticed point, and the selection section 270 transmits information of the selected button to the measurement correction section 260.

The noteworthy part set section 230 decides, with respect to the tomographic image designated in the noteworthy point among the tomographic images 310_X0 and 320_X0, the designated noteworthy point as noteworthy part P1, and decides, with respect to the tomographic image not designated in the noteworthy point, the same part as the noteworthy part decided to the other tomographic image as noteworthy part P2. According to the example of FIG. 7, when a morbid state change part on the tomographic image 310_X0 of the left side is clicked, it is decided that the morbid state change part is the noteworthy part P1, and a part corresponding to the noteworthy part P1 on the tomographic image 320_X0 of the right side is the noteworthy part P2. The positions of the thus determined noteworthy parts P1 and P2, and the tomographic images 310_X0 and 320_X0 are informed to the measurement section 240. The combination of the noteworthy part designation section 220 and the noteworthy part set section 230 corresponds to an example of the designation section referred to the present invention.

The measurement section 240 measures a length diameter and a short diameter of a morbid state change area including the noteworthy parts P1 and P2 on the tomographic images 310_X0 and 320_X0 (step S3 in FIG. 5). The measurement section 240 corresponds to an example of the first measurement section referred to the present invention.

It easily explains the method of measuring a length diameter and a short diameter of a morbid state change area including noteworthy parts P1 and P2.

Recently, there is widely used a machine learning in which for each two or more sample images taken a picture of by various scenes, there is calculated a lot of kinds of amounts of an image feature such as the maximum value, minimum value, the average value, and the mean value of pixel value, so that the correspondence of each scene and the image feature is studied with the computer. The use of the machine learning makes it possible to use the amount of the feature of the number that man cannot treat, and also to find a correlation that it is not taken into one's head in one's guess power either. Thus, it is possible to implement discrimination with greater accuracy. The measurement section 240 of the present embodiment stores a standard image features in a morbid state change area, which is understood as the tumor and the like beforehand, of the tomographic image, and performs a search of a morbid state change area by using the machine learning.

The measurement section 240 decides the noteworthy areas R1 and R2 which surround noteworthy part P1 and P2 on the tomographic images 310_X0 and 320_X0, respectively. The sizes of the noteworthy areas R1 and R2 are prepared beforehand as experienced value that a general tumor and the like are surely included.

Subsequently, image features of individual pixels, which compose noteworthy areas R1 and R2, are analyzed, and the pixel that agrees with an image feature for the morbid state change part preserved beforehand is searched among pixels that compose the noteworthy areas R1 and R2.

In addition, it is evaluated whether it is a pixel which composes the outline in a morbid state change part for the pixel that agrees with an image feature for the morbid state change part, and there is extracted from among noteworthy areas R1 and R2 the outline of morbid state change part areas S1 and S2 that are estimated to be the involved area including noteworthy part P1 and P2.

When the outline of the morbid state change areas S1 and S2 is extracted, a length diameter and a short diameter of the morbid state change areas S1 and S2 are measured.

Figure 8:
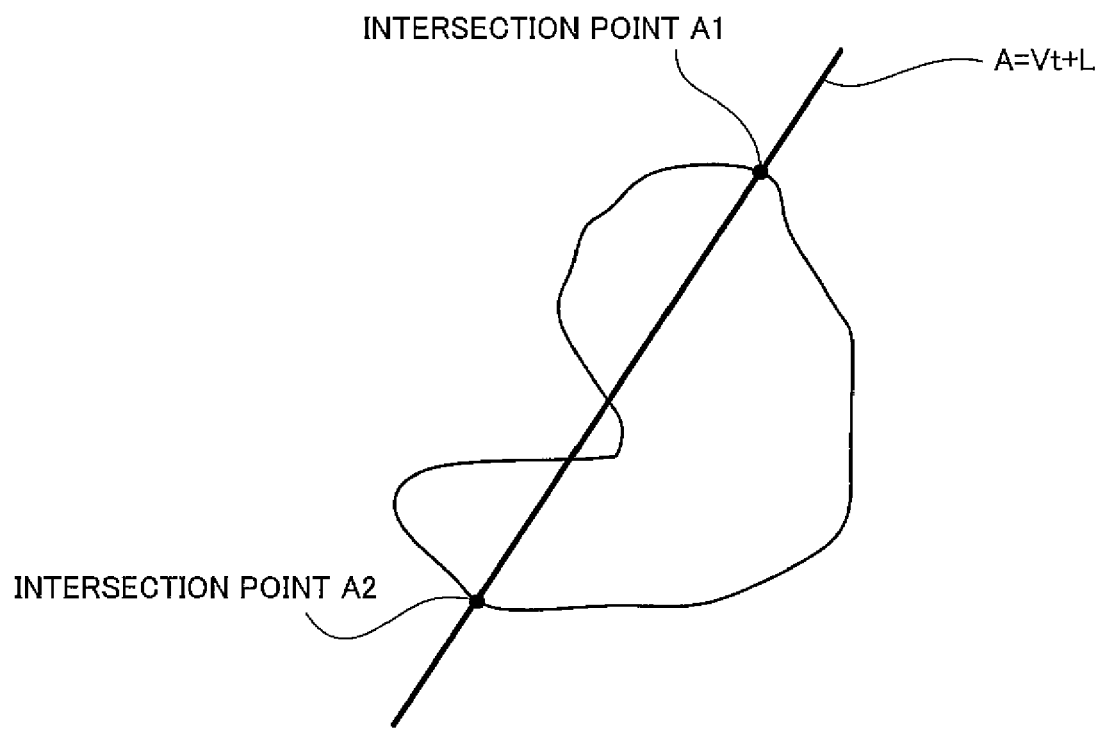
FIG. 8 is a view showing an example of a morbid state change area where an outline is extracted.

FIG. 8 is a view showing an example of a morbid state change area where an outline is extracted.

Segment A that represents length diameter and short diameter of a morbid state change area S is expressed by the following equation.

$$A = V \times t + L \quad (1)$$

Where the center of gravity of the area is made a starting point, "V" is the direction of the segment, "L" is the position of the segment, and "t" is the mediation variable.

Distance T(L,V) in position L and direction V of a morbid state change area S is the distance of two intersections A1 and A2 that exist most on the edges among intersections of the segment A of expression (1) obtained from those position L and direction V with the border line of the morbid state change area S. That is, the intersections A1 and A2 are expressed by the following equations.

$$A1 = V \times t1 + L$$
$$A2 = V \times t2 + L \quad (2)$$

Where the minimum value of mediation variable t in a common area of segment A and a morbid state change area S is denoted by "t1" and the maximum value is denoted by "t2".

The distance T(L,V) is expressed by the following equations.

$$T(L, V) = |V \times st1 - V \times t2| \quad (3)$$

Position L and direction V of a length diameter and a short diameter are computed about each the tomographic images 310_X0 and 320_X0, and the distance represented by expression (3) is computed in form of a measurement value of a length diameter and a short diameter. Positions L, directions V, segments A, and the measurement values, of a length diameter and a short diameter in each tomographic images 310_X0 and 320_X0 are transferred to the position and angle discrepancy computing section 250.

a series of processing, wherein upon receipt of designation of noteworthy parts P1 and P2, the outline of morbid state change areas S1 and S2 including the noteworthy parts P1 and P2 is extracted, and a length diameter and a short diameter of a morbid state change areas S1 and S2 are measured, as mentioned above, is a technology designed as an one click measurement.

The position and angle discrepancy computing section 250 computes the amount of the gap in the position and the direction of length diameter and short diameter of each tomographic images 310_X0 and 320_X0 (step S4 in FIG. 5). For example, assuming that the position and the direction of length diameter of the tomographic image 310_X0 is expressed by L1 and V1, respectively, and the position and the direction of length diameter of the tomographic image 320_X0 is expressed by L2 and V2, respectively, the amount of the gap in the position of the length diameter is expressed by |L1−L2|, and the amount of the gap in the direction of the length diameter is expressed by |V1−V2|. In a similar fashion, also regarding the short diameter, it is computed.

Moreover, the position and angle discrepancy computing section 250 judges whether the amount of misregistration and the amount of the gap in the direction of calculated length diameter and short diameter are all below a prescribed standard level. When it is decided that the amount of misregistration and the amount of the gap in the direction of calculated length diameter and short diameter are all below a prescribed standard level (step S5: No), the position and angle discrepancy computing section 250 informs the measurement correction section 260 of positions L, directions V, segments A, and the measurement values, of a length diameter and a short diameter in each tomographic images 310_X0 and 320_X0.

When there is something, which exceeds the standard level, among the amount of misregistration and the amount of the gap in the direction (step S5: Yes in FIG. 5), the position and angle discrepancy computing section 250 transmits an alarm notification instruction to the selection section 270. The selection section 270 instructs the image display section 280 to display the alarm notification screen. A combination of the position and angle discrepancy computing section 250 and the selection section 270 corresponds to an example of the permission request section referred to in the present invention.

Upon receipt of the instruction from the selection section 270, the image display section 280 displays on the display screen 32a a message "the shape of a morbid state change has changed greatly", and in addition displays a selection screen (not illustrated) for selecting whether measurement of a morbid state change area is to be continued (step S6 in FIG. 5).

When a user selects the discontinuance of the measurement on the selection screen (step S6: No in FIG. 5), the measurement of a morbid state the change area is discontinued. Because the shape of a morbid state change has changed greatly when misregistration and the gap in the direction of a morbid state change area are large among two or more tomographic images, a more elaborate inspection might become necessary. According to the medical treatment diagnostic system of the present embodiment, the message for warning is displayed when misregistration and the gap in the direction of a morbid state change area among two or more tomographic images exceed a standard level, and continuance/discontinuance of the measurement is selected. Thus, it is possible to omit unnecessary processing, and also to inform the user that the shape of a morbid state change has greatly changed.

Moreover, in a case where the amount of misregistration and the amount of direction are all below a standard level in the step S4 (step S5: No in FIG. 5), and in a case where continuance of the measurement is selected in the step S6 (step S7: Yes in FIG. 5), the selection section 270 transmits an instruction of correcting the measurement value to the measurement correction section 260.

The measurement correction section 260 decides common measurement direction and measurement position where the size of the morbid state change area on each tomographic images 310_X0 and 320_X0 is measured, and computes the size of common measurement direction and measurement position in a morbid state change area on each tomographic image 310_X0 and 320_X0 (step S8 in FIG. 5). The measurement correction section 260 corresponds to an example of the maximum difference direction discriminating section referred to in the present invention and an example of the second measurement section referred to in the present invention as well.

The measurement correction section 260 corrects the measurement value in accordance with a button which is selected by a user from among the other button 411, the change amount button 412, and the middle button 413.

When the other button 411 shown in FIG. 7 has been selected, the measurement position L1 and the measurement direction V1 determined on the tomographic image 310_X0 for which the user specified a noteworthy point are used to measure the other tomographic image 320_X0 as it is, and the distance T2 (L1, V1) are measured also in the measurement position L1 and the measurement direction V1 in accordance with the measurement method explained in conjunction with FIG. 8 and expressions (2) and (3). When the measurement of the length diameter ends, similar processing is executed about a short diameter.

Moreover, when the change amount button 412 shown in FIG. 7 is selected, the measurement value in the measurement position and the measurement direction, where the change amount of the shape of a morbid state change area is large, is calculated. For instance, assume that the measurement position L1 and the measurement direction V1 of the length diameter of a morbid state change area on the tomographic image 310_X0, and the length diameter T1 (L1,V1) are given, and the measurement position L2 and the measurement direction V2 of the length diameter of a morbid state change area on the tomographic image 320_X0, and the length diameter T2 (L2, V2) are given, sets (L1,V1) and (L2,V2) of the measurement position and the measurement direction in each tomographic images 310_X0 and 320_X0 are used for both the morbid state change areas, and distances T1 (L1,V1), T2 (L1,V1), T1 (L2,V2), and T2 (L2,V2) are measured by the measurement method where it explains by FIG. 8 and expressions (2) and (3). Those distances T1 (L1,V1), T2 (L1,V1), T1 (L2,V2), and T2 (L2,V2) are used to compute difference S (L1,V1) of the measurement value of the measurement position L1 and direction V1 of the tomographic image 310_X0 in accordance with expression (4) set forth below.

$$S(L1, V1) = |T1(L1, V1) - T2(L1, V1)| \quad (4)$$

And there is computed difference S (L2, V2) of the measurement value of the measurement position L2 and direction V2 of the tomographic image 320_X0 in accordance with expression (5) set forth below.

$$S(L_2, V_2) = |T2(L2, V2) - T2(L2, V2)| \quad (5)$$

In addition, there is adopted the measurement value of the measurement direction where the difference is the maximum. In case of difference S(L1,V1)>difference (L2,V2): measurement position and measurement direction on the morbid state change area meet the measurement position L1 and the measurement direction V1 on the tomographic image 310_X0, respectively; a measurement value of the morbid state change area on the tomographic image 310_X0 is decided to the measurement value T1(L1,V1) in the state of being computed by the measurement section 240; and the measurement value of the morbid state change area on the tomographic image 320_X is decided to measurement value T2(L1,V1). In case of difference S(L1,V1)≦difference (L2,V2): measurement position and measurement direction on the morbid state change area meet the measurement position L2 and the measurement direction V2 on the tomographic image 320_X0, respectively; a measurement value of the morbid state change area on the tomographic image 310_X0 is decided to the measurement value T1(L2,V2); and the measurement value of the morbid state change area on the tomographic image 320_X is decided to measurement value T2(L2,V2). Regarding the short diameter, it is similarly computed. According to this correction method, the measurement value of the direction of a morbid state change area where a shape has changed most is determined. This feature makes it possible to confirm more accurately the effect of treatment and the change of a morbid state.

When the middle button 413 shown in FIG. 7 is selected, the measurement values of the positions and the directions of the averages of the measurement positions and the measurement directions of two or more tomographic images are computed. First of all, average position ML=(L1+L2)/2 of measurement positions L1 and L2 of the tomographic images 310_X0 and 320_X0, respectively and average direction MV=(V1+V2)/2 of the measurement directions V1 and V2 of the tomographic images 310_X0 and 320_X0 are computed, respectively, and then measurement values T1(ML, MV) and T2(ML, MV) of the average position ML and the average direction MV of the morbid state change areas of the tomographic images 310_X0 and 320_X0 are computed, respectively. According to this correction method, it is possible to confirm the change amount of the averaged size of the morbid state change on two or more medical images.

Thus computed measurement values are transferred from the measurement correction section 260 to the image display section 280. The image display section 280 displays the measurement value of the length diameter and the short diameter calculated on the tomographic image display screen 410 shown in FIG. 7 in addition to the tomographic images 310_X0 and 320_X0 (step S9 in FIG. 5).

Figure 9:
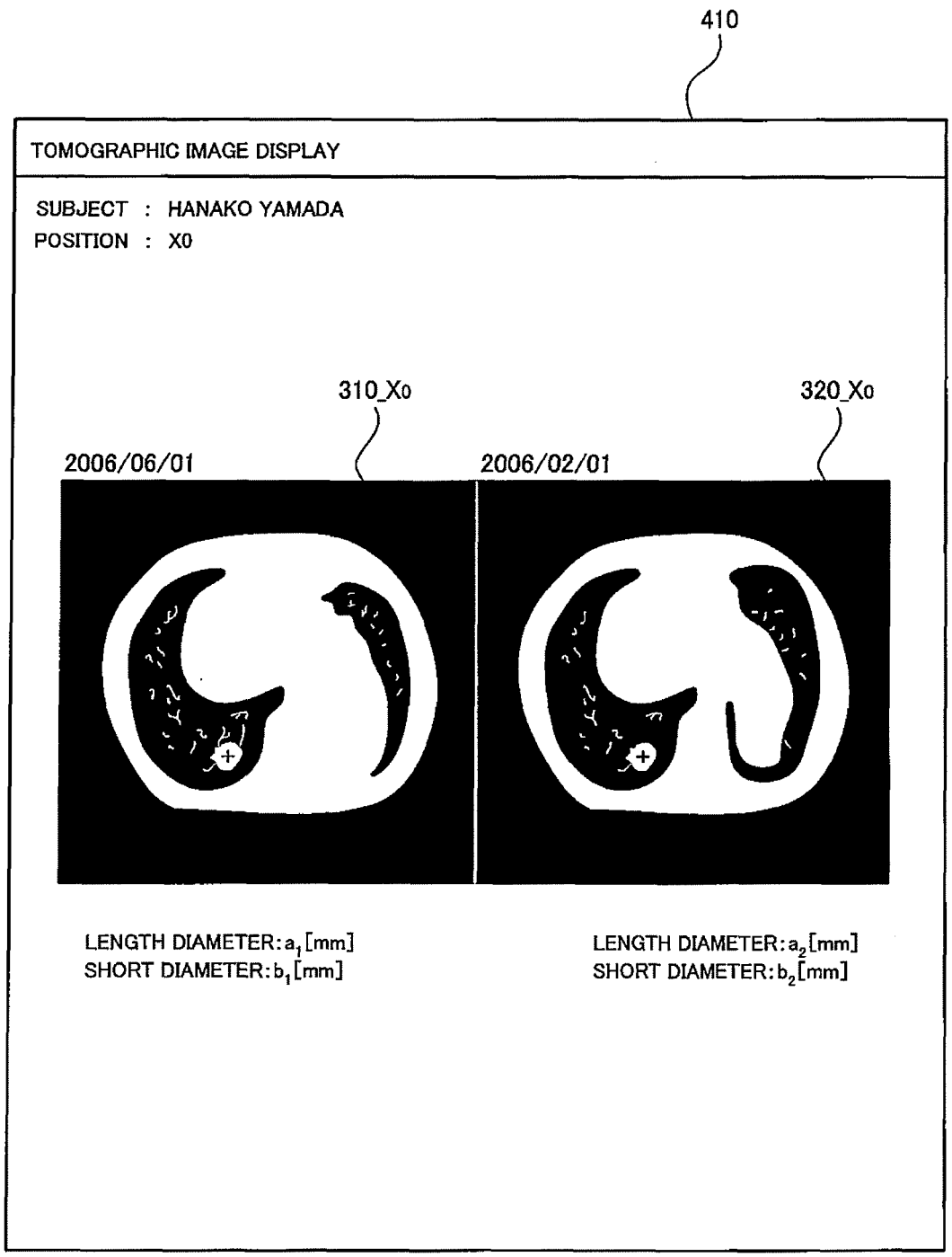
FIG. 9 is a view showing an example of a display screen for a tomographic image where the measurement value of a length diameter and a short diameter is displayed.

FIG. 9 is a view showing an example of a display screen for a tomographic image where the measurement value of a length diameter and a short diameter is displayed.

The tomographic image display screen 410 shown in FIG. 9 displays the length diameter and the short diameter of the morbid state change areas of the tomographic images 310_X0 and 320_X0 in addition to the tomographic images 310_X0 and 320_X0. Therefore, in the event that the increase and decrease of the focus area is small, a slight change in the condition can be confirmed though the change is blind even if the tomographic images 310_X0 and 320_X0 are simply compared with one another, because a length diameter and a short diameter are indicated by the figure in FIG. 9. Further, according to the present embodiment, a length diameter and a short diameter in the same position and direction of the focus area on each tomographic images 310_X0 and 320_X0 are measured only by specifying the focus part on other image of the tomographic images 310_X0 and 320_X0, and thus, it is possible to easily obtain accurate information useful for the diagnosis.

Here, the explanation of the first embodiment of the present invention is ended, and it explains the second embodiment of the present invention. The second embodiment of the present invention is substantially same as the first embodiment in the structure. Thus, in the following figures, same parts are denoted by the same reference numbers as those of the figures associated the first embodiment, and redundant explanation will be omitted.

Figure 10:
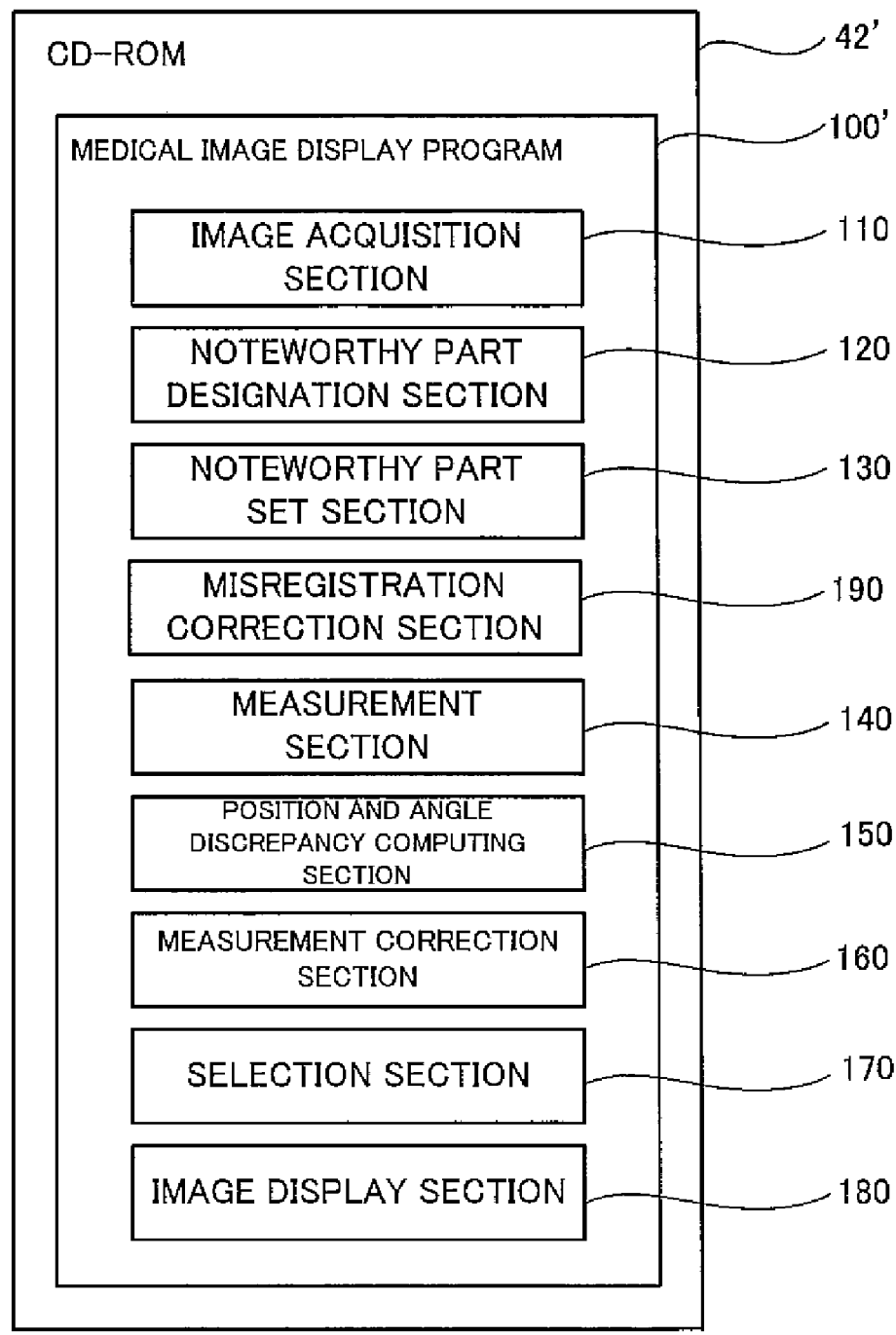
FIG. 10 is a conceptual view of CD-ROM that stores a medical image display program according to the second embodiment of the present invention.

FIG. 10 is a conceptual view of CD-ROM that stores a medical image display program according to the second embodiment of the present invention.

As shown in FIG. 10, a medical image display program 100' stored in the CD-ROM 42' comprises: an image acquisition section 110, a noteworthy part designation section 120, a noteworthy part set section 130, a measurement section 140, position and angle discrepancy computing section 150, a measurement correction section 160, a selection section 170, and an image display section 180, which are the same as the medical image display program 100 of the first embodiment shown in FIG. 3, and in addition a misregistration correction section 190.

The CD-ROM 42' shown in FIG. 10 is loaded onto the CD-ROM drive 305 of the diagnosis device 30 instead of the CD-ROM 42 shown in FIG. 3, and the medical image display program 100' stored in the CD-ROM 42' is up-loaded to the diagnosis device 30, and is stored in the hard disk drive 303. When the medical image display program 100' is activated and executed, there is constructed in the diagnosis apparatus 30 a medical image display unit 200' (refer to FIG. 11) according to the second embodiment of the present invention.

Figure 11:
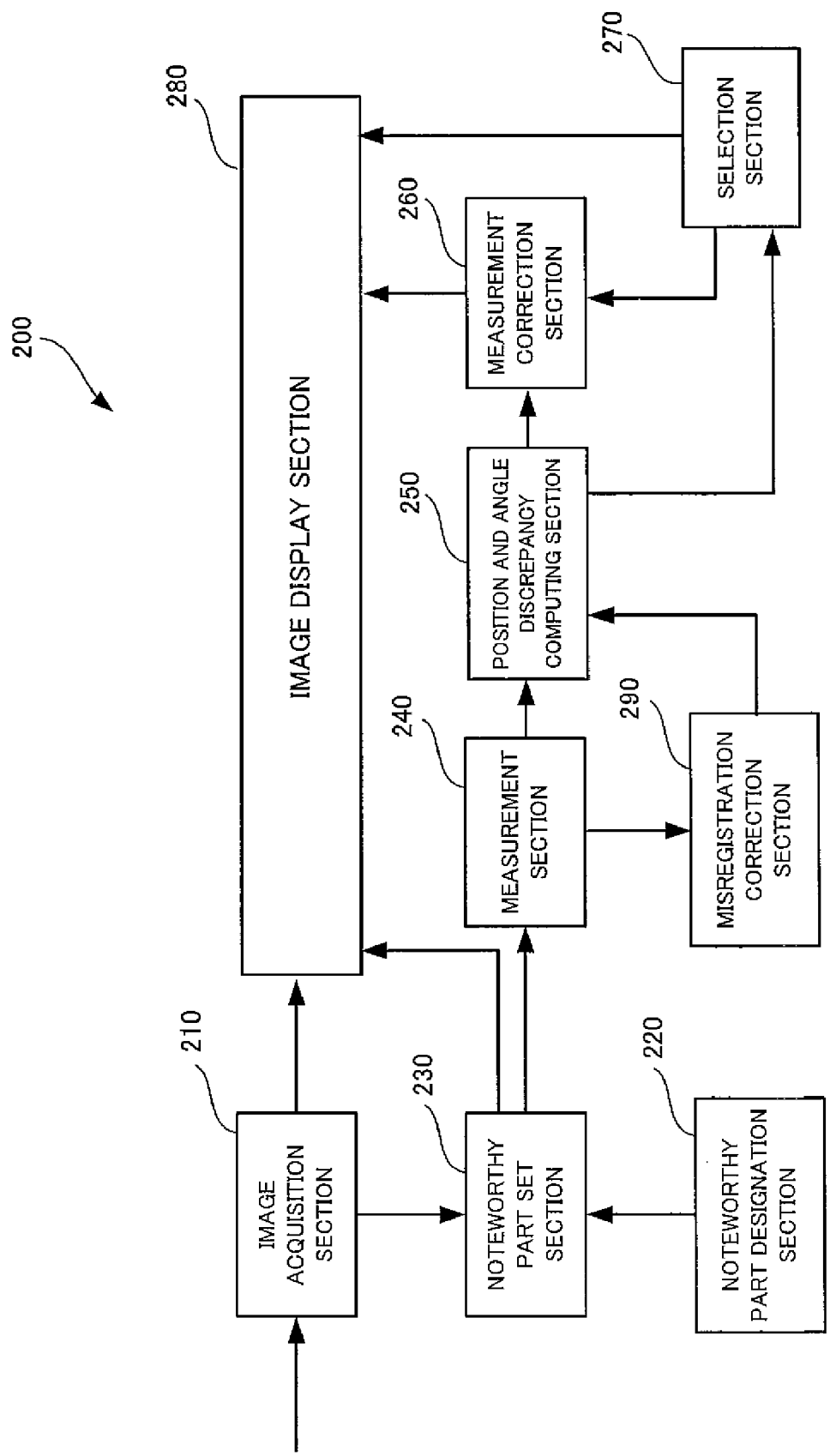
FIG. 11 is a functional block diagram of a medical image display unit according to the second embodiment of the present invention.

FIG. 11 is a functional block diagram of the medical image display unit 200' according to the second embodiment of the present invention.

The medical image display unit 200' comprises: an image acquisition section 210, a noteworthy part designation section 220, a noteworthy part set section 230, a measurement section 240, position and angle discrepancy computing section 250, a measurement correction section 260, a selection section 270, and an image display section 280, which are the same as the medical image display unit 200 according to the first embodiment shown in FIG. 4, and in addition a misregistration correction section 290.

According to the medical image display unit 200' of the present embodiment, when the noteworthy points are designated on the tomographic images 310_X0 and 320_X0 shown in FIG. 7, respectively, and the measurement section 240 executes the one click measurement, the outlines of the morbid state change areas R1 and R2 including the noteworthy points are extracted, and a length diameter and a short diameter are measured. The thus extracted morbid state change areas R1 and R2 are transmitted to the misregistration correction section 290.

The misregistration correction section 290 generates the transformation matrix that matches the position of the morbid state change areas R1 and R2 extracted for the tomographic images 310_X0 and 320_X0, so that the misregistration of the morbid state change areas R1 and R2 is detected.

Figure 12:
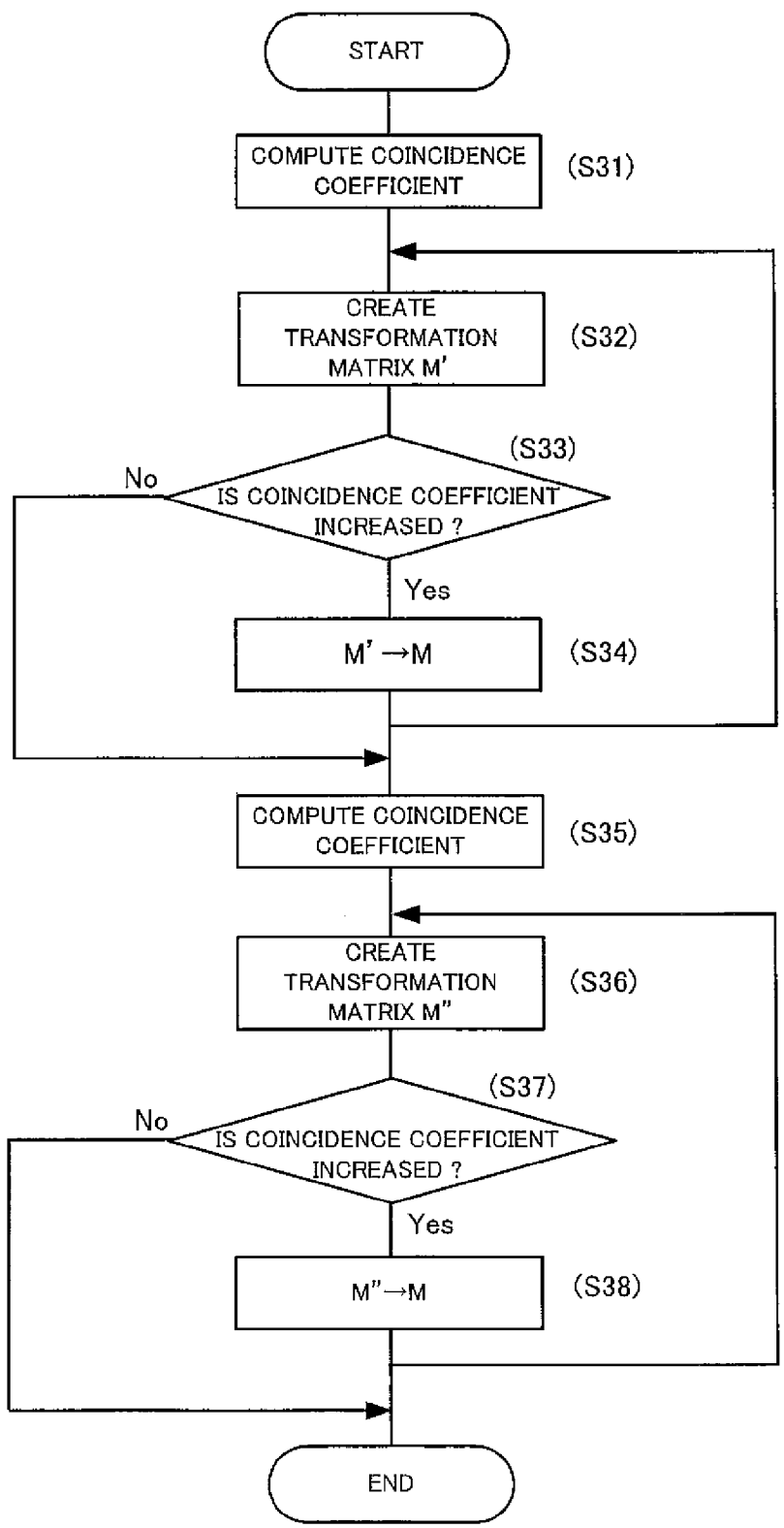
FIG. 12 is a flowchart useful for understanding a method of positioning of a morbid state change area.

FIG. 12 is a flowchart useful for understanding a method of positioning of a morbid state change area.

Here, there is computed by the serial processing the rigid body conversion wherein an overlap of the morbid state change areas R1 and R2 grows most (in the present embodiment, homogeneous transformation by the combination of the translation and the rotation).

As an initial matrix of the rigid body transformation matrix M to execute the rigid body conversion, there is set a transformation matrix to execute the translation that matches the center of gravity of the morbid state change areas R1 and R2.

First, the tomographic images 310_X0 and 320_X0 are subjected to positioning in accordance with the transformation matrix M, and a coincidence coefficient to evaluate a degree of overlapping of the morbid state change areas R1 and R2 is computed (step S31 in FIG. 12). Here, the sum total of the area of the overlapping part where the morbid state change areas R1 and R2 overlap with one another, of the tomographic images 310_X0 and 320_X0, is computed as the coincidence coefficient.

Next, a new transformation matrix M that adds the translation and the rotation of a prescribed amount is generated based on the rigid body transformation matrix M (step S32 in FIG. 12).

When the transformation matrix M' is generated, the tomographic images 310_X0 and 320_X0 are subjected to positioning in accordance with the transformation matrix M', and the coincidence coefficient is computed in a similar fashion to the step S31. In the event that the coincidence coefficient increases (step S33 in FIG. 12: Yes), it indicates that the area of the overlapping part of the morbid state change areas R1 and R2 increases, and the new transformation matrix M' is set to the rigid body transformation matrix M (step S34 in FIG. 12).

After the transformation matrix M' that adds the translation and the rotation of a prescribed amount is generated based on the new rigid body transformation matrix M, and the tomographic images 310_X0 and 320_X0 are subjected to positioning in accordance with the transformation matrix M', the coincidence coefficient is computed. Processing from step S32 to step S34 is repeatedly executed until the coincidence coefficient doesn't increase.

In the event that the coincidence coefficient doesn't increase (step S34 in FIG. 12: No), an alteration of the rigid body transformation matrix M is not performed, and a new standard coincidence coefficient is computed (step S35 in FIG. 15). Here, the coincidence coefficient is computed in accordance with the following equation (6).

$$\text{The coincidence coefficient} = aS \times bN \quad (6)$$

Where S denotes the area of the overlapping part wherein the morbid state change areas R1 and R2 overlap with one another, of the tomographic images 310_X0 and 320_X0, N denotes the correlation coefficient of the density value of the overlapping part, and coefficients a and b of expression (6) are set in accordance with kinds of the involved area and the like.

Next, there is generated a new transformation matrix M" based on the rigid body transformation matrix X, adding the density value in addition to the translation and the rotation of a prescribed amount (a step S36 in FIG. 12).

When the transformation matrix M" is generated, the tomographic images 310_X0 and 320_X0 are subjected to positioning in accordance with the transformation matrix M", and the coincidence coefficient is computed in a similar fashion to the step S31. In the event that the coincidence coefficient increases (step S37 in FIG. 12: Yes), the new transformation matrix M" is set to the rigid body transformation matrix M (step S38 in FIG. 12).

Processing from step S36 to step S38 is repeatedly executed until the coincidence coefficient doesn't increase.

Thus, when the rigid body transformation matrix N is computed, there is acquired positioning information such as migration length and rotation angle to match position and angle of the morbid state change area on the tomographic image 320_X0 to position and angle of the morbid state change area on the tomographic image 310_X0. According to the present embodiment, at this point, a positional match actually is not done, and there is performed only acquisition of the rigid body transformation matrix M and the positional match information.

The computed rigid body transformation matrix M and the positional match information thus computed are transmitted to the position and angle discrepancy computing section 250.

The position and angle discrepancy computing section 250 estimate the amount of the discrepancy in the position and the direction of the length diameter and the short diameter of the tomographic images 310_X0 and 320_X0, which are subjected to the positional match.

Figure 13:
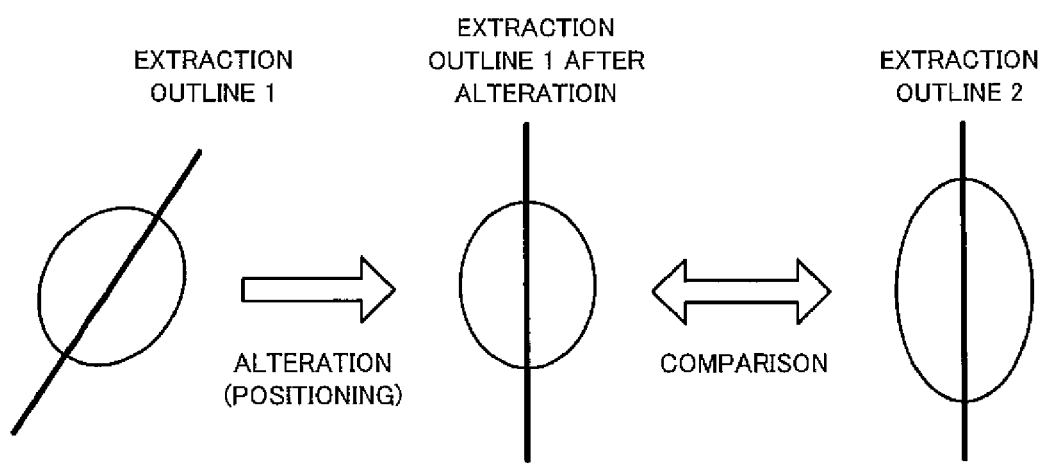
FIG. 13 is a conceptual view useful for understanding a method of presuming amount of discrepancy in position and direction of length diameter and short diameter.

FIG. 13 is a conceptual view useful for understanding a method of presuming amount of discrepancy in position and direction of length diameter and short diameter.

The position and angle discrepancy computing section 250 presumes, based on the positional match information transmitted from the misregistration correction section 290, the morbid state change area (extraction outline 1 after the alteration) on the tomographic image 320_X0 after correction where the morbid state change area (extraction outline 1 of FIG. 13) on the tomographic image 320_X0 meets the morbid state change area (extraction outline 2) on the tomographic image 310_X0 in position and angle. In the event that the thus presumed morbid state change area (extraction outline 1 after the alteration) meets the morbid state change area (extraction outline 1) on the tomographic image 310_X0, it is considered that the size of a morbid state change is not changed.

When there is the one that is larger than the reference value among the amount of misregistration and the amounts of direction of a length diameter and a short diameter, the warning notification instruction is transmitted from the position and angle discrepancy computing section 250 to the selection section 270 as well as the first embodiment. There are displayed on the display screen 32a such a message that "the shape of a morbid state change has changed greatly" and the selection screen to select whether the measurement of the morbid state change area is to be continued.

Moreover, when the amount of misregistration and the amounts of direction of a length diameter and a short diameter are all below a standard value and the continuance of the measurement is selected with the selection screen, the measurement correction section 260 corrects the measurement value in accordance with the button selected by the user from among the other button 411, the change amount button 412, and the middle button 413 which are shown in FIG. 7. Incidentally, according to the present embodiment, the measurement correction section 260 executes the computation of the measurement value taking into consideration misregistration by using the rigid body transformation matrix M computed in the misregistration correction section 290.

In the following, it explains assuming that the length of the length diameter is expressed by T1 (L1, V1), where L1 and V1 are position and direction of the length diameter of the morbid state change area on the tomographic image 310_X0, respectively; the length of the length diameter is expressed by T2 (L2, V2), where L2 and V2 are position and direction of the length diameter of the morbid state change area on the tomographic image 320_X0, respectively; Ff denotes the conversion formula that uses rigid body transformation matrix M computed in misregistration correction section 290; and Fb denotes the inversion formula of the conversion formula.

In the event that the other button 411 shown in FIG. 7 has been selected, the measurement value of the length diameter of the tomographic image 320_X is corrected to T2 (Ff(L1), Ff(V1)), when a noteworthy point is designated on the tomographic image 310_X0. Oppositely, when a noteworthy point is designated on the tomographic image 320_X0, the measurement value of the length diameter of tomographic image 310_X is corrected to T1 (Fb (L2), Fb (V2)).

On the other hand, in the event that the change amount button 412 shown in FIG. 7 has been selected, the above-mentioned expression (4) is altered to the following formula.

$$S(L1, V1) = |T1(L1, V1) - T2(Ff(L1), Ff(V1))| \quad (4)'$$

And the above-mentioned expression (5) is altered to the following formula.

$$S(L2, V2) = |T1(Fb(L2), Fb(V2)) - T2(L2, V2)| \quad (5)'$$

Further, in case of difference S(L1,V1)>difference (L2,V2) shown in expression (4)' and expression (5)', the measurement position and the measurement direction on the morbid state change area meet measurement position L1 and direction V1 on the tomographic image 310_X0, respectively, the measurement value of the morbid state change area on the tomographic image 310_X is decided to the measurement value T1(L1,V1) in the state of being computed in the measurement section 240, and the measurement value of the morbid state change area on the tomographic image 320_X is decided to the measurement value T2(Ff(L1),Ff(V1)). In case of the difference S(L1,V1)≦the difference (L2,V2), the measurement position and the measurement direction on the morbid state change area meet measurement position L2 and direction V2 on the tomographic image 320_X0, respectively, the measurement value of the morbid state change area on the tomographic image 310_X is decided to measurement value T1 (Fb(L2), Fb(V2)), and the measurement value of the morbid state change area on the tomographic image 320_X is decided to the measurement value T2(L2,V2) in the state of being computed in the measurement section 240.

In the event that the middle button 413 shown in FIG. 7 has been selected, position Lg1 of the length diameter and direction Vg1 of the length diameter of the morbid state change area on the tomographic image 310_X are corrected in accordance with the following equations.

$$Lg1 = (L1 + Fb(L2))/2$$

$$Vg1(V1 + Fb(V2))/2 \quad (7)$$

And the measurement value of the length diameter is decided to T1 (Lg1, Vg1).

Further, position Lg2 of the length diameter and direction Vg2 of the length diameter of the morbid state change area on the tomographic image 320_X are corrected in accordance with the following equations.

$$Lg2 = (Ff(L1) + L2)/2$$

$$Vg2 = (Ff(V1) + V2)/2 \quad (8)$$

And the measurement value of the length diameter is decided to T2 (Lg2, Vg2).

The computed measurement value is transmitted from the measurement correction section 260 to the image display section 280, and measurement values of a length diameter and a short diameter are displayed on the tomographic image display screen 410 shown in FIG. 7 with an arrangement of the tomographic images 310_X0 and 320_X0.

As mentioned above, a consideration of misregistration between the morbid state change areas on two or more medical images makes it possible to compute the size of the morbid state change areas with greater accuracy.

Here, though the above-mentioned description explained an example in which two medical images are arranged and displayed, it is acceptable that the image display section referred to in the present invention may display three medical images or more. To display three medical images or more, and to measure a length diameter and a short diameter of the morbid state change area on individual medical images, it is acceptable to retrieve a medical image, which is large in discrepancy of positions and directions of a length diameter and a short diameter, in the manner as mentioned below, and display, as to the retrieved medical image, the measurement value determined by the one click measurement, without performing a positional match of a length diameter and a short diameter, as it is. First of all, the length diameter of the morbid state change area of each two or more medical images is measured by the one click measurement. Next, average and dispersion for position and direction of the length diameter measured are determined, and the image that the square of the difference between the measurement value and the mean value becomes K times or more dispersion is judged as the medical image that is large in discrepancy. It is desirable that the value of K is altered in accordance with the kind etc. of a morbid state change.

Moreover, though the above-mentioned description explains an example of computing a size of an image using a length diameter and a short diameter of the morbid state change area, it is acceptable that the first measurement section and the second measurement section referred to in the present invention compute a size of an image using lengths such as those of a prescribed direction other than the short diameter and the length diameter.

Moreover, though the above-mentioned description explains an example of designating a noteworthy part on the tomographic image, it is acceptable that the size measurement apparatus and the image display unit referred to in the present invention designate, for instance, a noteworthy part on the tomographic image.

Moreover, though the above-mentioned description explains an example of manually designating the noteworthy part that is guessed by a user as a focus on the tomographic image, it is acceptable that the size measurement apparatus and the image display unit referred to in the present invention retrieve the image part that has the image pattern that looks like the sample image, on the tomographic image, by the image processing for instance, and the retrieved image part is set as a noteworthy part.

Moreover, it is acceptable that the size measurement apparatus and the image display unit referred to in the present invention preserve the position for the involved area on the tomographic image taken a picture of in the past, display the list for a past involved area when the set of a new tomographic image is obtained, and acquire the position for the involved area selected by the user to set it as this noteworthy part.

Moreover, it is acceptable that the size measurement apparatus and the image display unit referred to in the present invention set center points of the right lungs fields and the left lungs field as a noteworthy part, when a noteworthy part in the right lungs field and left lungs field is designated for instance.

Moreover, though the above-mentioned description explains an example in which the image display unit referred to in the present invention is applied to a diagnosis apparatus, it is acceptable that the image display unit referred to in the present invention is applied to a management server and the like.

As mentioned above, according to the present invention, it is possible to perform the size measurement suitable for comparison.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A size measurement apparatus comprising:
a designation section that designates a part in an image as to each of two or more medical images acquired through image taking for a subject;
a first measurement section that measures a size of the image presented in the part designated by the designation section, of the medical image, in a measurement direction according to a geometry of the image; and
a second measurement section that measures a size as to the image presented in the part designated by the designation section, in a common measurement direction common to each of the two or more medical images, the common measurement direction being determined in accordance with the measurement direction in the first measurement section,
wherein the first measurement section measures a length diameter and a short diameter of the image.

2. The size measurement apparatus according to claim 1, wherein the designation section designates a part on an image as to some medical images of the two or more medical images in accordance with an operation, and designates a part corresponding to the part on the image as to a medical image different from the medical image for which the part is designated among the two or more medical images.

3. The size measurement apparatus according to claim 1, wherein the first measurement section measures a size of the image as to one of the two or more medical images, and
the second measurement section measures a size of an image on the part designated by the designation section as to a medical image different from the medical image for which the size is measured by the first measurement section, of the two or more medical images, in the same measurement direction as the measurement direction in the first measurement section.

4. The size measurement apparatus according to claim 1, wherein the first measurement section measures a size of each image presented in each of the two or more medical images, in each measurement direction according to a geometry of the each image;
the second measurement section measures a size of each image presented in each of the two or more medical images, in the same measurement direction as the measurement direction used in the first measurement section for another image; and
the size measurement apparatus further comprises a maximum difference direction discriminating section that determines a measurement direction in which a size difference is maximum between images, of each measurement directions used in the first measurement section and the second measurement section.

5. The size measurement apparatus according to claim 1, wherein the first measurement section measures a size of the image for each of the two or more medical images, and
the second measurement section measures a size of the image for the medical image as to a mean direction of the measurement directions of the two or more medical images in the first measurement section.

6. The size measurement apparatus according to claim 1, wherein the size measurement apparatus further comprises a misregistration correction section that detects a misregistration of the image between the two or more medical images, and
the second measurement section measures a size of the image in consideration of the misregistration detected by the misregistration correction section.

7. The size measurement apparatus according to claim 1, wherein the first measurement section measures a size of the image for each of the two or more medical images,
the size measurement apparatus further comprises a permission request section that requests a permission for size measurement by the second measurement section when the measurement directions of the two or more medical images in the first measurement section are separated beyond a predetermined level, and
the second measurement section measures a size of the image when the size measurement is permitted for a request by the permission request section.

8. An image display unit comprising:
a designation section that designates a part in an image as to each of two or more medical images acquired through image taking for a subject;
a first measurement section that measures a size of the image presented in the part designated by the designation section, of the medical image, in a measurement direction according to a geometry of the image;
a second measurement section that measures a size as to the image presented in the part designated by the designation section, in a common measurement direction common to each of the two or more medical images, the common measurement direction being determined in accordance with the measurement direction in the first measurement section; and a display section that displays the two or more medical images and in addition sizes of images measured with the second measurement section, wherein the first measurement section measures a length diameter and a short diameter of the image.

9. A non-transitory computer-readable storage medium storing a size measurement program that is executed in a computer to build in the computer:

a designation section that designates a part in an image as to each of two or more medical images acquired through image taking for a subject;

a first measurement section that measures a size of the image presented in the part designated by the designation section, of the medical image, in a measurement direction according to a geometry of the image; and a second measurement section that measures a size as to the image presented in the part designated by the designation section, in a common measurement direction common to each of the two or more medical images, the common measurement direction being determined in accordance with the measurement direction in the first measurement section, wherein the first measurement section measures a length diameter and a short diameter of the image.

10. A non-transitory computer-readable storage medium storing an image display program that is executed in a computer to build in the computer:

a designation section that designates a part in an image as to each of two or more medical images acquired through image taking for a subject;

a first measurement section that measures a size of the image presented in the part designated by the designation section, of the medical image, in a measurement direction according to a geometry of the image;

a second measurement section that measures a size as to the image presented in the part designated by the designation section, in a common measurement direction common to each of the two or more medical images, the common measurement direction being determined in accordance with the measurement direction in the first measurement section; and a display section that displays the two or more medical images and in addition sizes of images measured with the second measurement section, wherein the first measurement section measures a length diameter and a short diameter of the image.

* * * * *